United States Patent [19]
Madison

[11] Patent Number: 5,485,741
[45] Date of Patent: Jan. 23, 1996

[54] VACUUM CALIBRATION METHOD FOR AN OPTICAL FIBER PRESSURE TRANSDUCER

[75] Inventor: Dennis S. Madison, Ramsey, Minn.

[73] Assignee: MedAmicus, Inc., Minneapolis, Minn.

[21] Appl. No.: 139,204

[22] Filed: Oct. 19, 1993

[51] Int. Cl.$^6$ .................................................. G01L 27/00
[52] U.S. Cl. ................ 73/4 R; 364/571.04; 364/571.05; 364/573; 364/582
[58] Field of Search ............................ 73/4 R, 4 V, 705; 364/571.04, 571.05, 571.07; 255/252.1 R, 252.1 A; 356/243

[56] References Cited

U.S. PATENT DOCUMENTS

| | | | |
|---|---|---|---|
| 3,686,958 | 8/1972 | Porter et al. | |
| 3,740,533 | 6/1973 | Van Zeggelaar | 73/4 R X |
| 3,790,910 | 2/1974 | McCormack | 73/4 R X |
| 4,064,396 | 12/1977 | Panarello | 364/573 |
| 4,213,462 | 7/1980 | Sato | 128/634 |
| 4,325,382 | 4/1982 | Miodownik | 128/673 |
| 4,428,239 | 1/1984 | Johnston | 73/705 |
| 4,446,715 | 5/1984 | Bailey | 73/1 R |
| 4,581,714 | 4/1986 | Reid | 364/571.07 |
| 4,590,791 | 5/1986 | Reed et al. | 73/4 R |
| 4,599,901 | 7/1986 | Hirschfeld | 73/705 |
| 4,672,974 | 6/1987 | Lee | 128/673 |
| 4,678,909 | 7/1987 | Jackson et al. | 73/705 X |
| 4,711,246 | 12/1987 | Alderson | 128/667 |
| 4,712,566 | 12/1987 | Hok | 128/748 |
| 4,752,141 | 6/1988 | Sun et al. | 374/161 |
| 4,760,250 | 6/1988 | Loeppert | 250/227 |
| 4,800,749 | 1/1989 | Merrick | 73/4 R |
| 4,856,317 | 8/1989 | Pidorenko | 73/4 R |
| 4,866,615 | 9/1989 | Ichihara | 364/571.04 X |
| 4,896,525 | 1/1990 | Breimesser | 73/1 R |
| 4,901,735 | 2/1990 | von Berg | 128/748 |
| 4,909,064 | 3/1990 | Talmadge | 73/4 R |
| 4,924,870 | 5/1990 | Wlodarczyk et al. | 128/667 |
| 4,936,310 | 6/1990 | Engstrom et al. | 128/673 |
| 4,939,926 | 7/1990 | Welch | 73/705 X |
| 5,005,584 | 4/1991 | Little | 128/675 X |
| 5,006,835 | 4/1991 | Griswold et al. | 340/626 |
| 5,115,668 | 5/1992 | Welch | 73/705 X |
| 5,247,171 | 9/1993 | Wlodarczyk | 250/227.21 |

FOREIGN PATENT DOCUMENTS

| 113630 | 5/1989 | Japan | 73/4 R |
| 1250857 | 8/1986 | U.S.S.R. | 73/4 R |
| 2072349 | 9/1981 | United Kingdom | G01L 9/00 |

*Primary Examiner*—Thomas P. Noland
*Attorney, Agent, or Firm*—Moore & Hansen

[57] ABSTRACT

The present invention provides a method for normalization and calibration of a fiber optic pressure transducer wherein the normalization routine includes measuring the minimum and maximum light signals returning from the pressure transducer and adjusting the offset and the gain such that the difference is a predetermined constant and wherein the calibration method has steps including: measuring the light signals and the pressures associated therewith for a variety of pressures; evaluating the light signals at preselected intervals by averaging the light signal with the one preceding it and following it; constructing a table having the evaluated light signals and the pressure readings associated therewith.

12 Claims, 2 Drawing Sheets

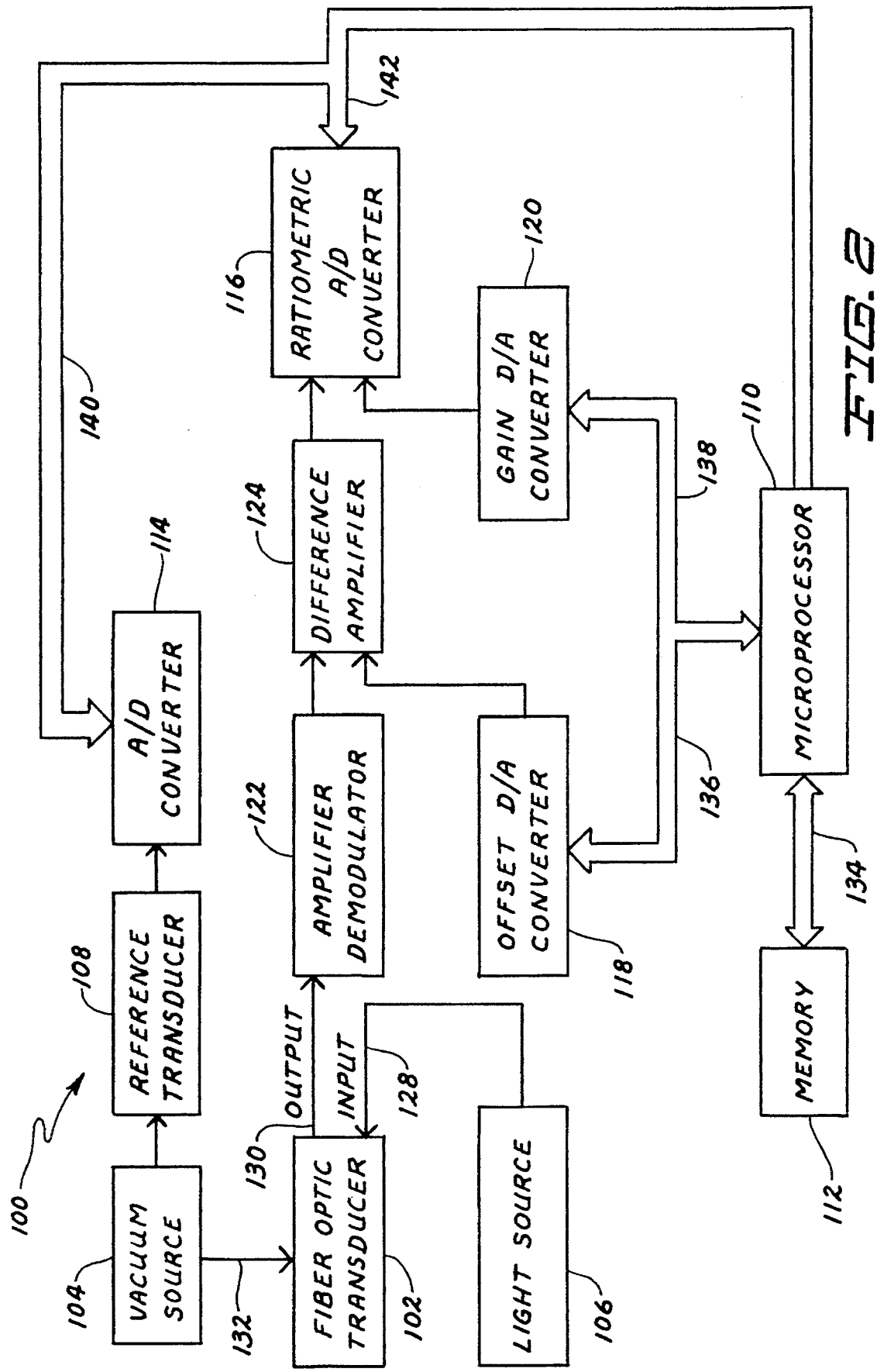

VACUUM CALIBRATION METHOD FOR AN OPTICAL FIBER PRESSURE TRANSDUCER

In general, the present invention relates to fiber optic pressure transducers and in particular to a method for normalizing and calibrating such instruments.

BACKGROUND OF THE PRESENT INVENTION

The commercial value of pressure transducers that incorporate optical fiber technology continues to increase. This increasing value stems from the many and varied applications being found for these devices. For example, because of their ability to provide rapid and accurate responses to pressure changes as well as the ability to manufacture the devices in clean room conditions and from biocompatible materials, fiber optic pressure transducers are being widely used in the medical community.

Broadly speaking, these devices include a pressure responsive member having a first surface exposed to the pressure desired to be measured and a second surface exposed to ambient atmospheric pressure The devices usually also include a housing that holds the pressure responsive member in a predisposed position relative to a housing aperture that allows the pressure responsive member to flex in the direction of least pressure in response to changing pressure differentials across the two surfaces. The housing also holds the distal end of an optical pathway in a predetermined position relative to the housing aperture and the pressure responsive member. The optical pathway includes a transmission path and a return path, which may comprise one or more optical fibers. Often, the pathway will include a reflector disposed at the distal end of the optical pathway in an optical coupling relation between the light transmission path and the light return path.

In operation, a light signal generated by a light source, such as a light emitting diode, is sent through the pathway on the transmission path from its proximal end to its distal end and then back through the pathway on the return path. Pressure differentials across the two surfaces of the pressure responsive member result in the movement of the pressure responsive member, thereby modulating the return light signal by variably obstructing the light signal. This modulation of the light signal results in changes in the intensity of the light returning through the pathway. A control unit receives the returned light signal and then, after appropriate conditioning of the return signal in a manner well known to the art, compares the intensity of the returning light signal with a correlation scheme that has been previously established between the measured intensity of the returned light signal and the pressure sought to be determined by the pressure transducer. This correlation scheme then provides an indication of the sensed pressure.

As noted above, prior to sing these devices they must be calibrated. Calibration of the instrument typically involves recording the modulated light signal returned to the control unit and a corresponding known pressure that is applied to the first surface. The modulated light signal in essence measures the amount of deflection of the pressure responsive member caused by the pressure differential across the first and second surfaces, and therefore also provides an indication of the pressure differential across the member, Normally, the second surface is exposed to a known pressure, most often ambient atmospheric pressure and, thus, the pressure differential measured is with respect to ambient atmospheric pressure. Calibration of the instrument will occur over the expected range of pressures that the transducer will experience.

Various calibration techniques are known to the medical instrument art. One such technique involves construction of a look-up table that matches the modulated light signals on a one-to-one basis with known pressures. During operation of the transducer then, the returned modulated light signal is simply matched against the look-up table with the calibrated pressure, which in turn is provided to an appropriate display for viewing by the attending clinician or physician. While relatively simple in concept and to implement, this technique has the failing that it does not in and of itself eliminate spikes that may occur in the calibration data. Such spikes may be caused by noise or interference of some sort in the signal itself or during the processing of the signal in the control unit. That is, the data, when plotted on a graph of light signal strength versus pressure, should ideally yield a substantially smooth curve. In reality, however, the calibration data frequently includes data points that lie substantially off the ideal curve. Matching a light signal against such a data point will result in a pressure reading that is substantially incorrect.

The requirement of having a large number of fiber optic pressure transducers perform accurately in a wide variety of clinical settings and with control units of varying type leads to a need for tightly controlled manufacturing processes so that the pressure transducers themselves perform within an expected range. As manufacturing tolerances tighten, the number of transducers that must be discarded for failing to meet product specifications increases. In addition to that type of additional cost, the cost of manufacture itself increases in and of itself. Finally, since the overall costs of manufacturing the transducers increases, the cost per transducer increases since the cost of the acceptable transducers must reflect not only the increased cost of the manufacturing process per se, but also the cost of the waste due to the throwaways that do not meet the product specifications.

It would be desirable to have a method of calibration of a fiber optic pressure transducer that reduced the likelihood of false pressure readings and that reduced the cost of manufacturing such transducers by reducing the need for establishing overly exacting manufacturing specifications and tolerances and by reducing the number of discarded units due to their failure to meet those specifications and tolerances.

SUMMARY OF THE PRESENT INVENTION

It is an object of the present invention to provide a new and improved method of determining a pressure within a particular environment using a fiber optic pressure transducer that is not subject to the foregoing disadvantages.

It is another object of the present invention to provide a method for determining a pressure within a particular environment that results in the reduction of manufacturing costs of the pressure transducer used to perform the pressure measurement.

It is yet another object of the present invention to provide a method for determining a pressure within a particular environment that results in the reduction of manufacturing costs of the pressure transducer used to perform the pressure measurement by reducing the criticalty of the manufacturing tolerances associated with manufacturing the pressure transducer.

It is still another object of the present invention to provide a method for determining a pressure within a particular environment that results in the reduction of manufacturing costs of the pressure transducer used to perform the pressure measurement by reducing the number of transducers discarded for failing to meet manufacturing tolerances and quality control specifications associated with manufacturing the pressure transducer.

It is another object of the present invention to eliminate the noise and data point spike problem found in present calibration systems for optical fiber pressure transducers.

It is still yet another object of the present invention to provide a new and improved method for the normalization and calibration of a fiber optic pressure transducer in the field prior to use.

The foregoing objects of the present invention are provided by a calibration system and method, including a normalization routine, that reduces manufacturing costs and substantially eliminates noise and other spikes from the calibration routine. A method of calibrating a fiber optic pressure transducer according to the present invention has the following steps: 1) varying: the pressure differential across the pressure sensitive member; 2) measuring the pressure differential and the light intensity for a given pressure differential so as to arrive at a predetermined number of data points; 3) by using the modulated light signals as an index, Constructing a table by selecting specific light signals at pre-selected intervals and averaging the light signals before, and after therewith to arrive at an average light index; and 4) associating the average light index readings with the respective known pressure for the specific light signals. In operation, the returning light sample will be sampled at specific intervals and compared against the aforesaid table. A pressure reading will be derived by interpolation from the two average light signal values closest to the sampled signal and their associated pressures using well known mathematical techniques known as a piece wise linear approximation.

An alternative embodiment of the present invention provides a calibration method having the following steps: 1) varying the pressure differential across the pressure sensitive member; 2) measuring the pressure differential and the light intensity for a given pressure differential; 3) applying a curve fitting formula to the data generated by step 2 so as to generate a plurality of equations, each equation being a linear equation of the form y=mx+b over a discrete, predetermined range of light signal intensity, where y=the pressure to be determined, m=the slope of the line, x=the modulated light signal, and b=a constant;

and 4) storing the plurality of generated linear equations for use during actual use of the fiber optic pressure transducer. During operation, that is, during clinical use of the transducer, the measured light signal will be compared to the predetermined light signal ranges, the appropriate, stored linear equation will be accessed, and the returned light signal will be simply substituted for "x" in the equation to yield a value for y, the pressure to be determined.

More generally, a curve fitting formula can be applied to the entire set of data points measured during the calibration sequence so as to establish a single equation for all of the data points. During operation, then, the matching of the light signal with a specific predetermined range can be eliminated.

Additionally, the present invention may include separate and distinct from a part of the calibration method a normalization routine or method. The normalization method may have the following steps: 1) measuring the maximum light intensity $L_{max}$ transmitted; 2) measuring the minimum light intensity $L_{min}$ transmitted; 3) adjusting the offset such that the minimum light intensity $L_{min}$ signal when convened to a voltage by means of a photodetector or equivalent device reads 0 volts, and 4) adjusting the gain such that the differences $L_{max}-L_{min}=C$, where C=a predetermined value.

The foregoing objects of the invention will become apparent to those skilled in the art when the following detailed description of the invention is read in conjunction with the accompanying drawings and claims. Throughout the drawings, like numerals refer to similar or identical parts.

BRIEF DESCRIPTION OF THE DRAWINGS

FIG. 2 is a functional block diagram of a fiber optic transducer calibration circuit.

DETAILED DESCRIPTION OF THE PRESENT INVENTION

Figure 1:
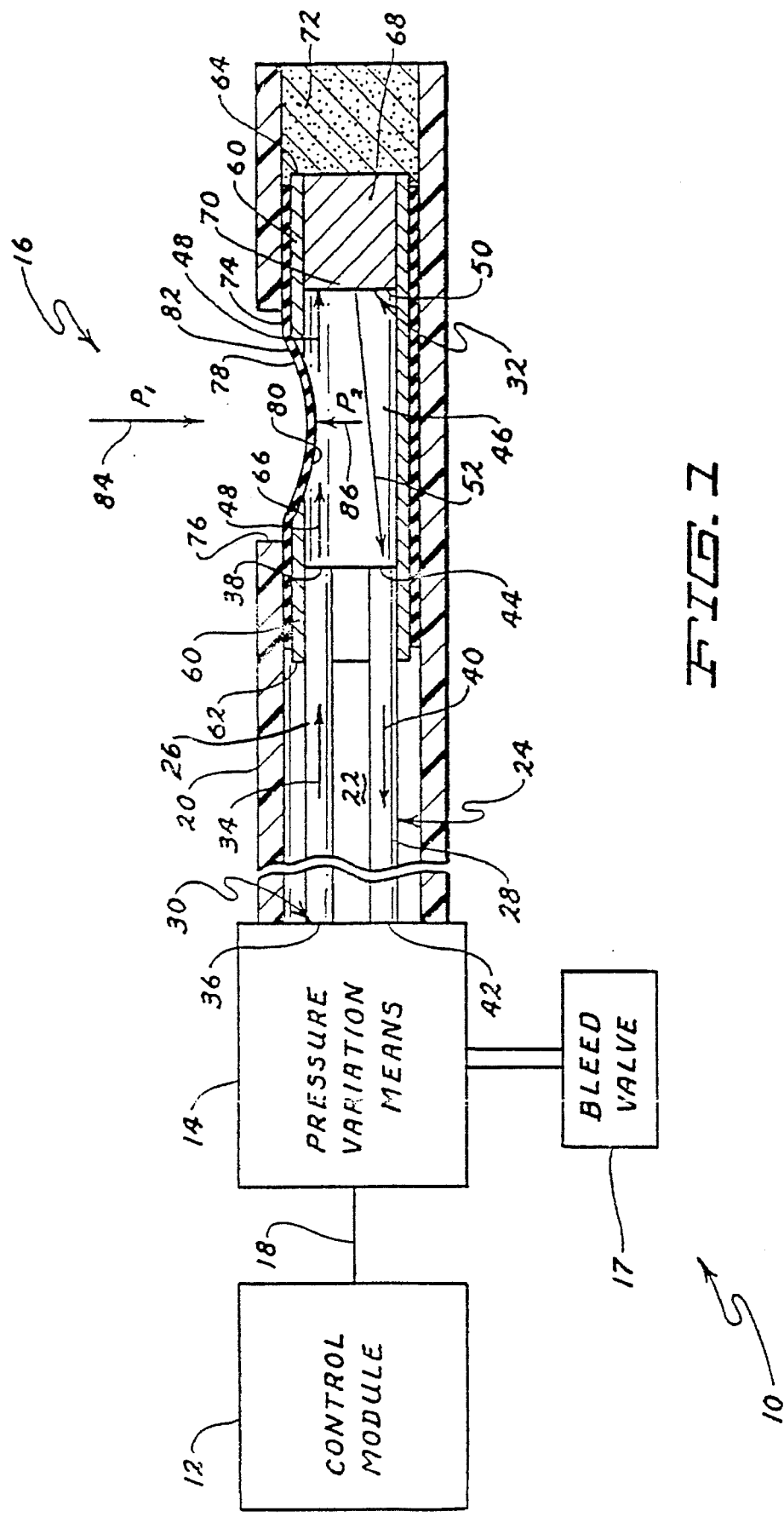
FIG. 1 shows in a schematic form a fiber optic pressure transducer of the type useful in accordance with the present invention.

Prior to describing a method in accord with the present invention, a brief description of a typical fiber optic: pressure transducer capable of being used with the present invention will be made with reference to FIG. 1. Thus, FIG. 1 shows a fiber optic pressure transducer system 10. System 10 includes a control module 12, a vacuum source, or generator, 14, and a fiber optic pressure transducer apparatus 16. A bleed valve 17 may be connected to the pressure variation means 14 and will be discussed further below. As is well known in the art, control module 12 comprises a light generator (not shown) for producing light signals that travel through the transducer apparatus 16, and an appropriate microprocessor (not shown) that controls the operation of vacuum source 14, as will be discussed further below. The microprocessor controls the operation of vacuum source 14 through the appropriate programming over an appropriate connection 18 based upon pressure sensed by a pressure transducer apparatus 16 to be described below.

Pressure transducer apparatus 16 includes a lumen 20 having at least one interior passage 22 that is sealed during normalization and calibration to the outside ambient atmosphere by well known means. Apparatus 16 further includes an optical pathway 24 that may comprise a single optical fiber, a pair of optical fibers 26 and 28 as shown, or an optical fiber bunch as is well known to the art. Optical pathway 24 may be disposed within passage 22 as shown, or, if desired, a separate passage within lumen 20 may be utilized for the optical pathway 24. Optical pathway 24 has a proximal end 30 and a distal end 32. Each fiber, in turn, also has proximal and distal ends. Thus fiber 26, which serves as the transmission path from the proximal end 30 to the distal end 32 of the optical pathway, as indicated by arrow 34, has a proximal end 36 and a distal end 38. Similarly, fiber 28, which serves partially as the return path from the proximal end 30 to the distal end 32 of the optical pathway, as indicated by arrow 40, has a proximal end 42 and a distal end 44. Light signals, typically of the type produced by a light emitting diode (LED) are transmitted from the proximal end 30 of pathway 24 disposed generally within control module 12 through the optical pathway 24 to the distal end 32 of the pathway 24 and then back to the control module 12. Thus, as seen in FIG. 1, light travels from control module 12 through fiber 26 to its distal end 38, across a gap 46 as indicated by arrows 48 m a reflector 50, which serves as the distal end 32 of pathway 24. The light signal is reflected by reflector 50 back across gap 46 to the distal end 44 of fiber 28 as indicated by arrow 52.

The distal end 32 of pathway 24 may terminate in a housing 60. Housing 30 typically has a substantially hollow cylindrical configuration, has proximal and distal ends 62 and 64, respectively, and includes an aperture 66 in the wall thereto. Thus, the distal end 32 of pathway 24 is received within the bore of housing 60 at the proximal end 62 thereof. The distal end 64 of housing 60 receives an end plug 68. Reflector 50 may comprise a reflective surface disposed on the proximal end 70 of end plug 68. Housing 60 may be affixed in place within lumen 20 by an appropriate adhesive or potting material 72, as is well known in the art.

A pressure responsive member 74 is disposed in covering relation to housing aperture 66, and the housing 60 and accompanying pressure responsive member 74 are disposed within lumen 20 closely adjacent a wall opening 76 therein. Pressure responsive member 74 is disposed such that a first or outer surface 78 is exposed, that is, pressure coupled, to the pressure sought to be determined, such as a vascular, urological, or an intracranial pressure, by means of wall opening 76, and a second or interior surface 80 is exposed, that is, pressure coupled, to the pressure within lumen passage 22. Where a separate passage is used for the optical pathway 24, as noted earlier, the lumen passage would still be pressure coupled to surface 80.

Pressure responsive member 74 is disposed on housing 60 for the purpose of sensing the pressure and changes in the pressure of the particular environment in which the member 74 is disposed. Member 74 may take the form of a patch or, as shown, a sleeve that completely and snugly encircles housing 60. Member 74 flexes either inwardly or outwardly as the pressure on surface 78 changes. It is understood that "inward" refers to a direction towards the center of the housing 60. The portion of flexible member 74 that overlies the aperture 66 in the housing 60 is a pressure-sensitive segment 82, which is free to flex or deflect transversely with respect to the path of light passing longitudinally between the distal end 32 of optical pathway 24 and reflector 50. The material of the membrane sleeve is preferably elastomeric, and could be urethane or silicone. In addition, it is also known in the art to use membranes made of a metallic material. These metallic membranes may also be used with the present invention.

As a particularly beneficial feature, the pressure responsive member 74 is secured around the outside of housing 60 over the aperture 32 cut therein so as to be placed in tension in a prestressed condition. Pre-stressing in tension member 24 around housing 60 and over the aperture 66 causes the member to be initially set at an inwardly flexed condition in which pressure responsive segment 82 thereof is curved inwardly. The pressure responsive member is placed in tension a predetermined extent so that segment 82 will have an inward, sufficient deflection so that segment 82 will extend slightly into the linear path of light traveling between distal end 38 of light transmission fiber 26 and reflector 50. Segment 82 is free to flex either inwardly or outwardly. Thus, because of its initial, inward deflection partially blocking the flow of light through the fiber optic light-transmitting circuit and because passage 22, which is pressure coupled to the second or interior surface 80 of flexible segment 82, will be at ambient atmospheric pressure, segment 82 is able to sense negative pressures or pressures below atmospheric pressure within the body of a patient. Thus, if the pressure being sensed externally of pressure responsive member 74 decreases, the segment 82 will flex slightly outwardly to permit a greater passage of light between the distal end 32 of pathway 24 and reflector 50. The deflection of segment 82 in response to changes in the pressure differential across its inner and outer surfaces is assured by coupling the inner surface 80 of segment 82 to the pressure within passage 22, which is sealed to the outside atmosphere.

Changes in light transmission will be sensed as a signal indicating a change in pressure, either positive or negative, that is, an increase or decrease, on the first or exterior surface. The returned, pressure responsive member modulated light signal will be appropriately conditioned and then will be compared with a preestablished calibration schedule or table to provide a indication of the pressure being exerted on the first surface 78 of pressure responsive member 74.

During normalization and calibration of the transducer, a vacuum will be drawn on the interior surface 80 of the transducer 16 by pressure variation means 14, which may comprise a vacuum pump. The outside surface 78 will be exposed to a known pressure such as ambient atmospheric pressure. Air will bleed back into the interior of the transducer through bleed valve 17, causing an increase in the pressure on the interior surface 80. The interior pressure may then be measured and correlated with the returning light signal intensity as the air slowly bleeds back into the interior of the transducer 16.

The features of a typical fiber optic pressure transducer having been described, FIG. 2 will now be referred to for a description of the present invention. FIG. 2 is a functional block diagram of a fiber optic transducer calibration circuit 100. Circuit 100 includes a fiber optic transducer 102 similar to that previously described; a vacuum source 104 that is utilized during the normalization and calibration procedures; a light source 106 that provides a light signal that is modulated by movement of the pressure transducer pressure responsive member in the aforedescribed manner; and a reference transducer 108 that determines the pressure within the transducer lumen during normalization and calibration procedures. The circuit 100 further comprises a microprocessor 110; a memory 112; and the appropriate signaling processing circuitry, including a pair of analog to digital (A/D) converters 114, 116; an offset digital to analog (D/A) converter 118; a gain D/A converter 120; an amplifier demodulator 122; and a difference amplifier 124. The operation of circuit 100 is controlled by microprocessor 110. Microprocessor 110 receives inputs from and provides outputs to memory 112, A/D converters 114, 116, and D/A converters 118 and 120.

The light source 106 provides an input over an appropriate connector 128 to the fiber optic pressure transducer 102, which, because of pressure changes resulting in the movement of a pressure sensitive member, provides a modulated output signal to amplifier demodulator 122 over an appropriate connector 130. Vacuum source 104 provides means for varying the pressure on the second or inner surface 80 of the pressure responsive member 74 during normalization and calibration procedures, and is connected to transducer 106 by an appropriate connector 132. The reference transducer 108 provides a signal indicative of the pressure within transducer 102 during normalization and calibration procedures to A/D converter 114. The amplifier demodulator 122 amplifies the modulated light signal output from transducer 102 and provides an output signal to difference amplifier 124. Difference amplifier 124 may comprise an operational amplifier receiving as one input the signal from the amplifier demodulator 122 and as the other input a signal from the offset D/A converter 118. The output of the amplifier 124 is provided as the input to the ratiometric A/D converter 116 with the reference coming from gain D/A converter 120. The output of the ratiometric A/D converter 116 is provided to microprocessor 110. As noted, microprocessor 110 provides signals to and receives signals from: memory 112 over connector 134; offset D/A converter 118 over connector 136; gain D/A converter 120 over connector 138; and A/D converters 114 and 116 over connectors 140 and 142, respectively.

The normalization and calibration of the transducer and system will now be described. During the succeeding discussion it will be understood that references will be made to light signals of a certain voltage. It will be understood that it is well known in the art that the light signals themselves are not measured as a voltage but in lumens or some equivalent unit. Furthermore, it will be understood that is well known in the art that the light signals are received by a photodetector or equivalent device and converted into an electrical signal having a voltage and that it is this voltage signal that is referred to when reference is made to a light signal of a certain voltage; that is, it is a converted light signal.

Normalization of the transducer and system must occur at start-up of the system or whenever there is a reset of the system following a start-up, such as a disconnection of a catheter enclosing a fiber optic pressure transducer. When such a "power on" or reset condition occurs, the offset D/A converter will be set to have an initial condition of 0.0 volts while the gain D/A converter will be set to have an initial condition of 5.0 volts, or some other pre-established value. A transducer will then be attached to the control unit and the normalization sequence will be activated by operating the appropriate switch on the control unit. The light signal will then be measured and recorded at a zero pressure differential across the member, that is, with ambient atmospheric pressure on both surfaces of the pressure responsive member. The vacuum source 104 will be activated to draw a vacuum on the interior surface of the lumen of the fiber optic pressure transducer apparatus, thereby creating a zero pressure on the second or inner surface 80 of the pressure responsive member 74. This vacuum will be monitored by reference pressure transducer 108. This step is equivalent to subjecting the transducer to maximum external pressure. A light signal will be supplied by the light source 106, which will travel through the optical pathway of the transducer 102, will be modulated by the movement of the pressure responsive member, and will return as an output signal from the transducer 102 that is provided to the amplifier demodulator 122. When a zero pressure, or vacuum, is drawn interior to the transducer lumen, the pressure responsive member will deflect inwardly in the direction of least pressure, thereby providing the greatest possible obstruction of the light signal and resulting in the return of the minimum possible light. This light signal return at zero pressure will be measured and stored in memory 112.

The light signal range, that is, the difference between the maximum light signal and the minimum light signal, will next be calculated and recorded. The offset D/A converter 118 will be reset such that the minimum return light signal reads zero (0.0) volts and the gain D/A converter will be reset such that the maximum return light signal reads five (5.0) volts. In general, then, the normalization method may include the following basic steps: 1) measuring the maximum light intensity $L_{max}$ (or more generally, $L_1$) transmitted; 2) measuring the minimum light intensity $L_{min}$ (or more generally $L_2$) transmitted; 3) adjusting the instrumentation offset such that the minimum light intensity $L_{min}$ transmitted reads 0 volts, and 4) adjusting the instrumentation gain such that the differences $L_{max}-L_{min}=C$, where, $C=$ a predetermined value such as five volts.

The foregoing normalization process results in each transducer that is used being normalized such that the light signal output from the transducer will fall within the range of zero to five (0.0 to 5.0) volts. Because the light output signal from each transducer can be normalized to fall within the a desired range, the manufacturing tolerances can be loosened, thereby reducing costs in the first instance and secondarily by reducing the number of transducers rejected for failure to meet quality control specifications.

The normalization and calibration procedure will continue from this point with the calibration portion of the procedure. A vacuum will be drawn again internally of the transducer 102. Preferably, the previously drawn vacuum will have been allowed to return to atmospheric pressure because: the cycling of the transducer in this manner will reduce hysteresis in subsequent pressure excursions. If desired, this cycling may also be performed prior to taking any readings, such as at start-up of the system, to reduce further any hysteresis effects. The vacuum will then be allowed to bleed off slowly through an appropriate valve until atmospheric pressure is reached. In this way a varying pressure differential is applied across the pressure sensitive member. As the vacuum is bled off, that is, as the pressure differential is varied, a pre-determined number, say one thousand twenty four (1024), for example, of readings from both the transducer 102 and the references pressure transducer 108 are taken. These readings are put in an array in the memory 112 with the fiber optic readings from the pressure transducer 102 being used as the index used to construct the array or table.

Continuing with the calibration sequence of the normalization and calibration procedure, the reference pressure transducer readings will be evaluated at predetermined intervals, say every thirty second (32d) reading, for example, by averaging that pressure transducer reading with the pressure reading preceding it (the thirty first (31st)) and the pressure reading following it (the thirty third (33d)). This average pressure reading will then be associated with the thirty second fiber optic index reading. In this way, a new array will be constructed having thirty two (32) fiber optic signal readings and thirty two (32) associated reference pressure readings. The calibration sequence will now be complete.

More generally, using the fiber optic readings as an index, every nth reference pressure transducer reading will be averaged with the n−c reading through the n+c reading, where c is a constant greater than or equal to 1, and associated with the nth fiber optic reading. A (m/n)×2 array will thus be constructed, where m is the total number of readings taken and n is the interval at which the readings are being averaged.

In operation of the transducer, a fiber optic reading will be compared against the reduced array, and an interpolation will be done between the nearest readings to arrive at a pressure reading P reported as the pressure sought and subsequently displayed. The displayed pressure reading may be calculated according to the following equation:

$$P=P_1+(L_{Meas}-L_1)\times(P_1-P_2)/(L_1-L_2),$$

where $L_{Meas}=$the measured light signal;

$L_1=$the light signal next smallest to the measured signal $L_M$;

$L_2$=the light signal next greatest to the measured signal $L_M$;

$P_1$=the pressure reading associated with $L_1$; and $P_2$=the pressure reading associated with $L_2$.

This type of interpolation is known as a piece wise linear approximation and is useful assuming that the reaction of the pressure sensitive member to pressure changes is substantially finer over small ranges.

More specifically, the measured data points could be split into small groupings of, say 8, 16, or 32 readings, and a curve fitting formula could be applied to each range of readings so as to yield a linear equation of the form y=mx+b over each discrete, predetermined range of light signal intensity, where y=the pressure to be determined, m=the slope of the line, x=the modulated fight signal, and b=a constant.

These equations will then be stored in the memory 110 for later retrieval. During operation of the transducer, the measured light signal will be compared to the various ranges, the appropriate equation will be selected, and the measured light intensity will be inserted into the equation to yield the pressure which will subsequently be displayed or recorded as desired. The particular curve fitting formula used to generate the linear equations can be selected as desired. Curve fitting formulas of the type just mentioned are well known in this art and the mathematical field and will not be discussed further herein. Again, this method works best where the deflection of the pressure sensitive member in the pressure transducer 102 is linear over small pressure ranges.

Alternatively, a curve fitting process could by applied to the entire set of data points derived by the calibration proceeding to yield a single curve with a single formula of the general type y=f(x), where y is the pressure to be determined and is a function of x, the returning light signal. Such a generated equation may take various forms, such as an exponential or second or third order equation, for example, depending on the measured data. The measured light signal could then be inserted into the equation and a pressure reading derived therefrom. Computer software is commercially available that would perform this curve fitting process to the measured pressures and light signals and yield such a functional relationship between the measured pressures and light signals.

The present invention having thus been described, other modifications, alterations, or substitutions may now suggest themselves to those skilled in the art, all of which are within the spirit and scope of the present invention. For example, the pressure transducer described relies upon the movement of the pressure sensitive member into and out of the pathway of the light signal to modulate the light signal. The present invention is useful in relation to other light signal modulating types of devices. Examples of such other types of devices include those where the reflective surface is disposed on the pressure sensitive member itself and the modulation of the signal occurs in the time difference between the arrival of successive light pulses as the pressure sensitive member deflects due to pressure changes, thereby lengthening or shortening the light pathway. Other optical transducers that modulate light signals in some manner are known also, the present invention being capable of functioning with those other types of transducers as well. It is therefore intended that the present invention be limited only by the scope of the attached claims below.

I claim:

1. A method for normalizing and calibrating a pressure measurement system of the type having an optical pathway for conducting light to and from a pressure sensor comprising a pressure sensitive member that modulates the intensity of light returning from the pressure sensor in response to the sensed pressure, wherein the pressure sensor is connected in a calibration circuit including an offset and a gain, said method comprising:

initially normalizing the pressure measurement system transducer prior to calibration thereof by carrying out the steps of:
  a. measuring the maximum light intensity returned from the pressure sensor;
  b. measuring the minimum light intensity returned from the pressure sensor;
  c. subtracting the minimum light intensity from the maximum light intensity to arrive at an intensity difference figure; and
  d. adjusting the gain such that the intensity difference figure equals a predetermined constant and thereafter calibrating the said pressure measurement system by the steps of:
  a. transmitting light of known intensity along the optical pathway;
  b. applying a pressure differential across the pressure sensitive member;
  c. varying the pressure differential;
  d. measuring the value of the pressure differential and the returning light intensity a preselected number of times;
  e. storing the measured values of pressure and corresponding light intensity signals; and
  f. applying a curve fitting formula over a discrete, predetermined range of light intensity signals to the stored values to arrive at a plurality of linear equations of the form y=mx+b, where
    y=the pressure to be determined,
    m=the slope of the line,
    x=the modulated light signal, and
    b=a constant,
    each said equation applying to one of the said predetermined light intensity signals.

2. The method of claim 1 wherein the pressure sensitive member has opposing sides, one side thereof intended for exposure to a pressure sought to be determined, and wherein said step of measuring the minimum light intensity includes:

drawing a vacuum on the other side of the pressure sensitive member.

3. The method of claim 1 wherein the pressure sensitive member has opposing sides, one side thereof intended for exposure to a pressure sought to be determined, and wherein said step of measuring the minimum light intensity includes:

drawing a vacuum on the other side of the pressure sensitive member; and allowing said vacuum to return to ambient atmospheric pressure prior to calibrating said pressure sensor.

4. The method of claim 1 wherein the pressure sensitive member has opposing sides, one side thereof intended for exposure to a pressure sought to be determined, and wherein said pressure differential is applied by drawing a vacuum on the other side of the pressure sensitive member, the one side being exposed to ambient atmospheric pressure, said pressure differential being applied by allowing said vacuum to bleed off.

5. The method of claim 1 wherein said plurality of equations are stored for later use during actual operation of the pressure sensor.

6. The method of claim 1 and further including:

e. adjusting the offset such that the minimum light intensity transmitted when converted to a voltage by means of a photodetector or equivalent device reads 0 volts.

7. A method for normalizing and calibrating a pressure measurement system of the type having an Optical pathway for conducting light to and from a pressure sensor comprising a pressure sensitive member that modulates the intensity of light returning from the pressure sensor in response to the sensed pressure, wherein the pressure sensor is connected in a calibration circuit including an offset and a gain, said method comprising normalizing the pressure measurement system by: measuring the maximum light intensity returned from the pressure sensor, measuring the minimum light intensity returned from the pressure sensor, subtracting the minimum light intensity from the maximum light intensity to arrive at an intensity difference figure, and adjusting the gain such that the intensity difference figure equals a predetermined constant and thereafter:

calibrating the saidpressure measurement system by the steps of:
 a. transmitting light of known intensity along the optical pathway;
 b. applying a pressure differential across the pressure sensitive member;
 c. varying the pressure differential;
 d. measuring the value of the pressure differential and the returning light intensity a preselected number of times;
 e. storing the measured values of pressure and corresponding light intensity signals; and
 f. applying a curve fitting process to the stored values to arrive at a plurality of linear equations of the form $y=f(x)+b$, where
  $y$=the pressure to be determined,
  $f(x)$=a function of the modulated light signal, and
  $b$=a constant.

8. The method of claim 7 wherein the pressure sensitive member has opposing sides, one side thereof intended for exposure to a pressure sought to be determined, and wherein said step of measuring the minimum light intensity includes:
 drawing a vacuum on the other side of the pressure sensitive member.

9. The method of claim 7 wherein the pressure sensitive member has opposing sides, one side thereof intended for exposure to a pressure sought to be determined, and wherein said step of measuring the minimum light intensity includes:
 drawing a vacuum on the other side of the pressure sensitive member; and
 allowing said vacuum to return to ambient atmospheric pressure prior to calibrating said pressure sensor.

10. The method of claim 7 wherein the pressure sensitive member has opposing sides, one side thereof intended for exposure to a pressure sought to be determined, and wherein said pressure differential is applied by drawing a vacuum on the other side of the pressure sensitive member, the one side being exposed to ambient atmospheric pressure, said pressure differential being applied by allowing said vacuum to bleed off.

11. The method of claim 7 wherein said equation is stored for later use during actual operation of the pressure sensor.

12. The method of claim 7 and further including:
 e. adjusting the offset such that the minimum light intensity transmitted when converted to a voltage by means of a photodetector or equivalent device reads 0 volts.

* * * * *